(12) United States Patent
Krestel

(10) Patent No.: US 6,264,207 B1
(45) Date of Patent: Jul. 24, 2001

(54) SEAL WITH CAVITIES

(76) Inventor: Karl Heinz Krestel, Jagdfeldring 12, 85540 Haar (DE)

( * ) Notice: Subject to any disclaimer, the term of this patent is extended or adjusted under 35 U.S.C. 154(b) by 0 days.

(21) Appl. No.: 09/112,599

(22) Filed: Jul. 9, 1998

(30) Foreign Application Priority Data

Jul. 11, 1997 (DE) .......................................... 297 12 235 U

(51) Int. Cl.$^7$ ...................................................... F16J 15/46
(52) U.S. Cl. ............................................ 277/645; 277/605
(58) Field of Search .............................. 404/47; 405/135; 52/393; 277/605, 626, 645, 906

(56) References Cited

U.S. PATENT DOCUMENTS

| 2,615,741 | * | 10/1952 | Nathan | 277/605 |
| 3,173,699 | * | 3/1965 | Nathan | 277/605 X |
| 3,643,965 | * | 2/1972 | Nicholson | 277/645 |
| 3,762,826 | * | 10/1973 | Bowman | 277/645 X |
| 4,667,966 | * | 5/1987 | Oehrle et al. | 277/645 |
| 4,743,036 | * | 5/1988 | Nicholas | 277/645 |
| 6,003,873 | * | 12/1999 | Solberg | 277/605 X |

* cited by examiner

Primary Examiner—Robert J. Sandy
Assistant Examiner—Karlena D. Schwing
(74) Attorney, Agent, or Firm—Charles E. Temko

(57) ABSTRACT

A seal using a seal body (1) which is subdivided in a latticework-like fashion into tensile struts (6) and compressive struts (7), forming cavities (8), and has an introduction portion (4) and can thus be used as a primary seal. The seal body (1) can be part of a seal arrangement (55) which includes a test and/or post-sealing space (56, 56a). In the case of pipe runs, an inner access line (60) or an outer access line (70) can be provided in order to test the sealing integrity of the seal and possibly to effect a post-sealing operation for leak-remedy purposes.

3 Claims, 9 Drawing Sheets

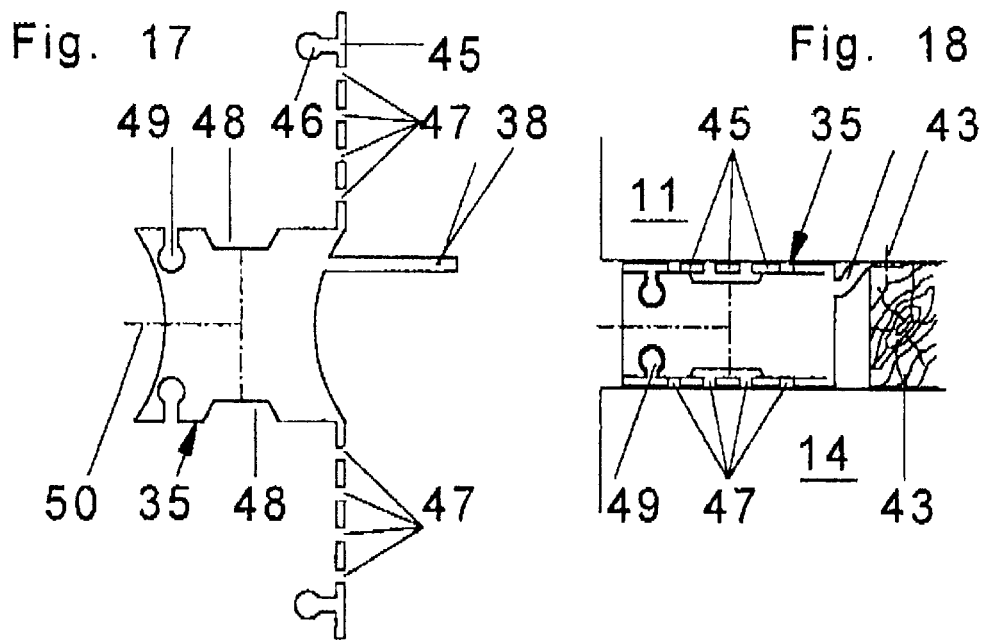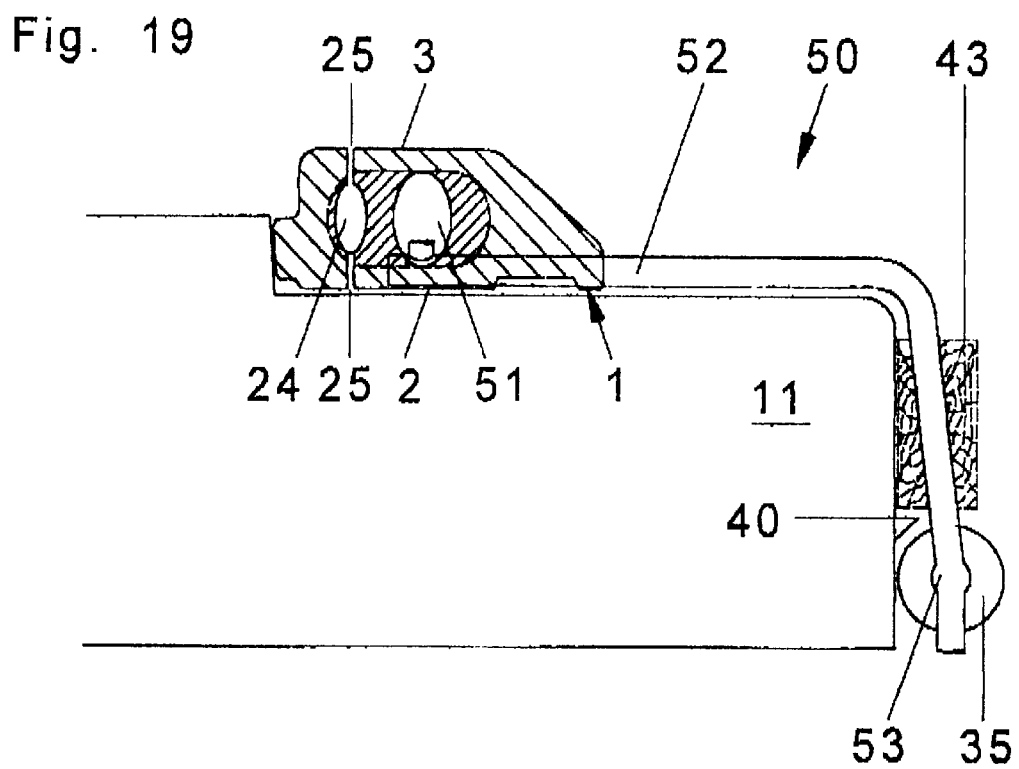

SEAL WITH CAVITIES

BACKGROUND OF THE INVENTION

The invention relates to a seal for sealing joints between a higher-pressure space and a lower-pressure space on parts and components to be sealed off, in particular on ducts or conduits comprising concrete pipes and shaft structures.

A seal a primary seal in the form of a taper sliding ring and a comprising secondary seal in the form of an axially projecting annular bead with a high degree of flexibility, is known from U.S. Pat. No. 3,417,942 Jornhagen subdivided in a latticework-like fashion and which has air-filled cavities without an outlet opening. The taper sliding ring is carried on the cylindrical surface of the spigot end of a pipe while the annular bead is disposed on the radial front face of that spigot end. Upon assembly with the socket end of a pipe, the socket slides over the inclined surface of the taper sealing ring and compresses it so as to afford a pressure profile with a rising pressure flank. The annular bead as the secondary seal is compressed to a greater or lesser degree when the pipes are fitted together, the pressures which occur in that situation being low because otherwise the pipes are pushed apart by that pressure. Accordingly, the sealing action with annular bead seals is not very great, and not adopted for a relatively great pressure drop. When using taper sliding rings as the primary seal, the sealing action depends on the width of contact and the surface pressure, which in turn are very heavily dependent on the production tolerances of the pipes which are to be fitted one into the other, such tolerances determining the width of the gap which is to be sealed off. If the gap is of great width, then the sealing width is small and the contact pressure is low while a narrow gap means that the sealing width and the contact pressure admittedly become high, but the risk of the seal being squashed or the risk of cracks being formed in the socket of the pipe or the spigot end thereof can become great.

U.S. Pat. No. 522,413 discloses a seal for sealing the expansion gap between concrete portions. The seal includes so-called chevron walls which, by virtue of their Y-shaped configuration, bend slightly and guarantee an approximately uniform contact pressure, irrespective of the width of the gap. It is not possible to provide sealing integrity between a high-pressure space and a low-pressure space.

Seals with a cavity as a pressing means are known per se (German Provisional Applications 38 15 142 and 42 36 368). In such an arrangement, a cavity disposed in the seal body is charged with liquid, possibly setting pressing agent under high pressure, small pipe portions of which are passed through the precast concrete parts being used for that purpose. The cavity cannot be used as a test space to establish sealing integrity of the seal.

It has long been known for expansion joint seals to be provided with cavities which by virtue of high internal pressure result in an increased contact pressure on the part of the seal (German published application 551 816).

Arranging slide lugs on the inclined surface of sliding seals is known from Germany published Application No. 36 01 757.

SUMMARY OF THE INVENTION

It is an object of the invention to provide a seal for sealing gaps at parts and components to be sealed off, in which the contact width and the contact pressure of the seal can be selected and in which the gaps or joins to be sealed off do not have to satisfy excessive tolerance demands. The invention seeks to provide that the contact pressure of the seal can possibly be proportionally increased as a result of internal pressure.

In accordance with a second aspect of the invention the seal is adapted to be self-lubricating and/or is adapted to automatically take up its sealing effect.

In accordance with a third aspect of the invention the invention seeks to provide that the seal can be checked and activated (post-sealed).

The present invention provides a seal body which preferably has mutually parallel sides with which it lies in the gap between the components to be sealed off, as a primary seal. Cavities are so disposed in the seal body that a support structure is afforded in the manner of a latticework, but with comparatively thick braces or struts which do not bend but which are widely spaced. If the seal is compressed in the gap which is to be sealed off, certain regions act as compressive struts and others as tensile struts. The pressure struts can yield and expand in the direction of the cavities, with the tensile struts being subjected to a tensile force. That provides internal stress distribution in the seal, which is better in comparison with a solid body, in order to seal off gaps and joints of different widths, without the contact pressure of the seal against the components in that situation experiencing an excessive increase. In that case, the seal body can be made up from different materials involving different hardnesses, and more specifically the seal body can comprise on the outside a relatively soft material in order to be able better to adapt to the roughness and unevenness of parts or components to be sealed off, while the tensile and pressure struts in the core region of the seal body should comprise firmer and harder material in order to ensure that the seal provides the necessary contact pressure against the parts or components to be sealed off, in order to achieve the condition of sealing integrity. The contact pressure of the seal against the parts to be sealed off can be further increased by the cavities of the seal being communicated with the space which is at a higher pressure, so that the pressure which is to be sealed off in itself has a supporting effect in relation to the seal.

When dealing with pipes the seal body can either be pulled on to the spigot end or it can be inserted into or concreted into the socket bell end.

When dealing with such pipes which are to be fitted one into the other, it is possible to provide on the seal body cavities (pockets) which can have a lubrication function. In quite general terms it is possible to use cavities or recesses which contain a post-sealing material in gel or solid form (that is to say those which become active and thus provide an additional sealing effect, upon moisture or water contact).

In the embodiment in the form of a twin or duplex seal, sealing integrity visual checks or sealing integrity initial tests and repetition test procedures can be carried out with air or water. The testing operation can be performed individually For each pipe joint or (when a suitable procedure is employed) it can be implemented centrally for an entire run of pipes. In addition, if a leak is found, an annular space which is arranged between two seal bodies can be filled with post-sealing material. Direct access to that annular space (testing and post-sealing space) can be such that there is no weakening due to additional bores being formed in the pipes which are joined together.

BRIEF DESCRIPTION OF THE DRAWINGS

Further features are described with reference to the drawings in which:

FIG. 17 shows a secondary seal for parallel gaps, for example for underground pipes, designed for post-sealing purposes, FIG. 18 shows the seal of FIG. 17 after installation, FIG. 19 shows a double seal system having a primary seal and a secondary seal which are simultaneously activated by way of a connecting hose.

DETAILED DESCRIPTION OF THE DISCLOSED INVENTION

Figure 1:
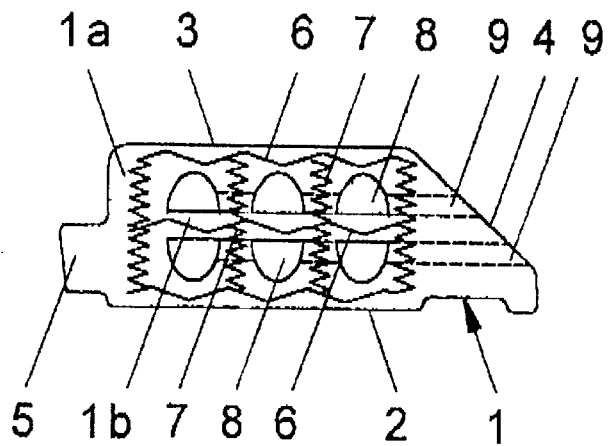
FIG. 1 is a view in cross-section through a seal.

FIG. 1 is a view in cross-section through a seal. There is provided a seal body 1 comprising a first elastomer 1a and a second elastomer 1b. The term elastomer is used to denote all elastic materials which are to be considered as the seal material. That includes rubber materials, polyurethane and polyvinylchlorides. The cross-section of the seal body approximates a rhombus. A lower base side 2 and an upper top side 3 extend parallel to each other and serve as sealing surfaces. An introduction portion 4 has an inclined surface as an assembly aid. A side with a projection 5 serves for support purposes after installation. Cavities 8 are disposed in mutually superposed relationship in a story-like configuration in the interior of the seal body 1. The second elastomer 1b is firmer and harder than the first elastomer 1a and forms tensile or drag struts or braces 6 and compressive pressure struts or braces 7 which are fairly thick relative to their length. The tensile and compressive struts 6 and 7 are arranged in a latticework-like fashion and divide the cavities 8. The cavities 8 are communicated with the inclined surface of the introduction portion 4 of the seal by way of ducts 9 which, when the seal is in the compressed condition, have been bored from the inclined surface as blind bores into the cavities 8 in order during the loaded condition of the seal to form through ducts. The passageways 9 provide for venting of the cavities 8 so that no air pockets or inclusions under high pressure can be formed when the seal is in the fitted and compressed condition, which air pockets would experience a drop in pressure with the passage of time and thus result in relaxation of such a seal with air pockets under pressure.

The seal can be produced by co-extrusion of softer (1a) and harder (1b) elastomer material. The extruded portion is cut into pieces of suitable length and can be used directly as a seal, in a suitable environment. It is also possible for the cut ends of such extrusion pieces to be vulcanised together in order to produce sealing rings therefrom. Such sealing rings can be directly drawn on to the spigot end of a concrete pipe. It is also possible for such a ring seal to be anchored in the socket of a concrete pipe.

Figure 2:
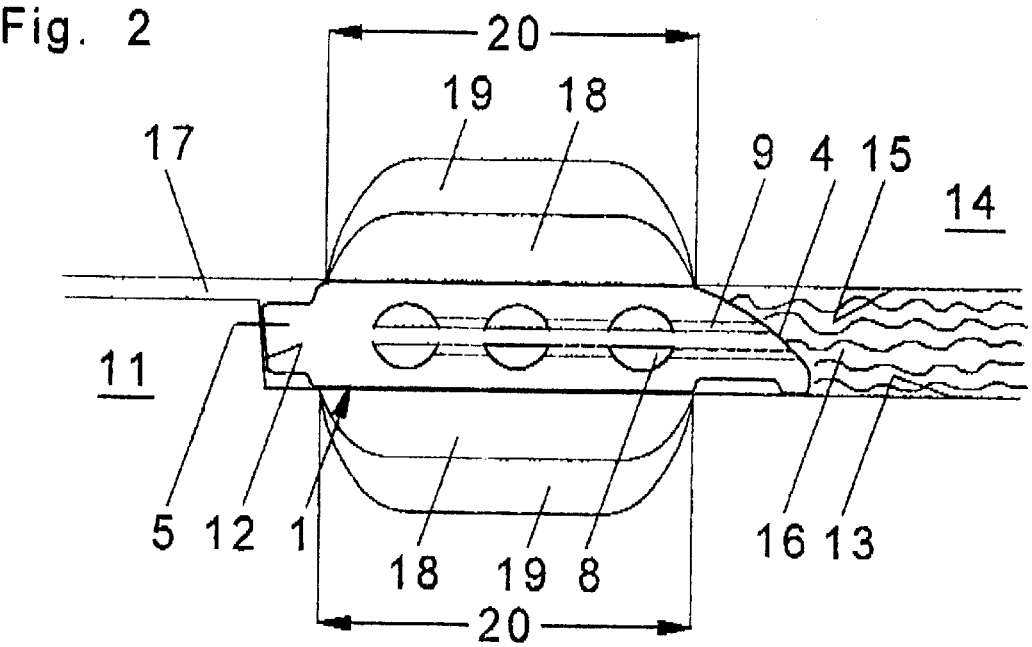
FIG. 2 is a diagrammatic view of the installation of the seal between concrete parts.

The use of a sealing ring of that kind for sealing the gap between components or parts to be sealed off is diagrammatically illustrated in FIG. 2. A main area of use is conduit or sewer construction using concrete pipes. A first pipe has a spigot end 11 which is formed by a radial shoulder surface 12 and an axially extending surface 13. The other pipe has a socket 14 of which the axial surface 15 is indicated. The surfaces 13 and 15 are arranged in mutually parallel relationship. When the pipe ends 11 and 14 are fitted one into the other, a socket gap 16 and a shoulder gap 17 remain. The seal 1 is disposed between the higher-pressure side of the socket gap 16 and the lower-pressure side with the shoulder gap 17. The gap 16 is thinner than corresponds to the thickness of the seal body 1, but it is of the same shape. Therefore, when the pipe ends 11 and 14 are assembled, the tube socket 14 bears against the inclined surface of the introduction portion 14 and compresses the seal. When that happens, the struts 7 come under pressure and partly deflect in the direction of the cavities 8, with a part of the struts 6 coming under a tensile loading. Overall the cavities 8 are reduced in size, as shown in FIG. 2. The struts 6, 7 develop a restorative force which results in a contact pressure along the contact surfaces 2, 3 of the seal 1 With the parts 11 and 14 which are to be sealed off, as indicated by pressure areas 18. The hydrostatic pressure in the gap region 16 passes by way of the ducts 9 into the cavities 8 and results in an increase in contact pressure, as indicated by the pressure areas 19. The pressure areas 18 and 19 act along the entire sealing portion 20 of the seal, which is the total width of the seal in the deformed condition minus the regions 4 and 5.

By virtue of a suitable selection of the first elastomer 1a and the width of the sealing portion 20, it is possible to bridge over and cover roughness and unevenness in the surfaces 13 and 15. In this respect, a functional separation is desirable between the edge region comprising softer material 1a and the core region with the struts 6, 7 of harder material 1b, as the softer material of the main body 1 can better adapt to such unevenness without having to afford an increased restorative force which can be applied by the harder struts 6, 7. The harder elastomer 1b also has the advantage of a lower degree of relaxation in comparison with softer elastomer so that the strut construction makes it possible to achieve compressibility as when using softer material, without having to tolerate the disadvantage of relaxation which, when using softer material, occurs after passage of time and then reduces the sealing effect.

The cavities 8 perform a dual function: i.e. affording space for deflection of the struts, and engagement surfaces for the pressure medium. Without ducts 9, air would be enclosed in the cavities 8, which with the passage of time diffuses to the exterior and results in relaxation of the seal whereby the return or restoration force and therewith the effectiveness of the seal are reduced.

Figure 3:
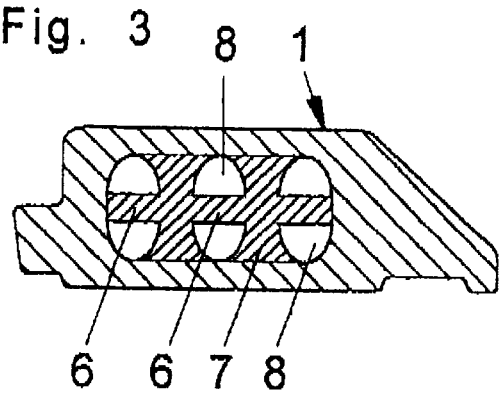
FIG. 3 is a view with a harder inner part and a softer outer part.

FIG. 3 shows an embodiment of the seal in which the harder elastomer 1b is limited to a narrower contact region whereby the tensile struts 6 are provided only in the center between the cavities 8. In that case, the softer material 1a above and beneath the cavities 8, and beside the function of covering and adapting to unevenness and roughness, substitutes the a functions of the tensile and compressive struts. The compressive struts 7 are of harder material also only extend between the cavities 8 while the softer material 1a is disposed laterally of the cavities and acts as compressive struts at locations of reduced contact pressure.

Figure 4:
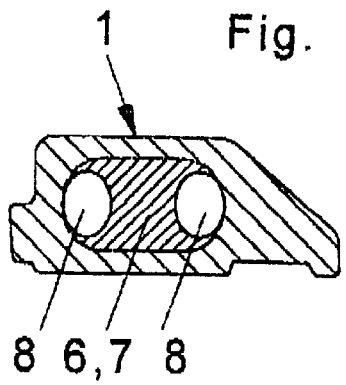
FIG. 4 shows a simplified embodiment for smaller seal bodies with a harder inner part and a softer outer part.

FIG. 4 shows a simplified embodiment of the seal 1 for smaller cross-sections, and more specifically there is only one row of cavities 8 instead of two rows. The space between the cavities 8 is filled with harder elastomer 1b which performs the function of the struts 6 and 7.

Figure 5:
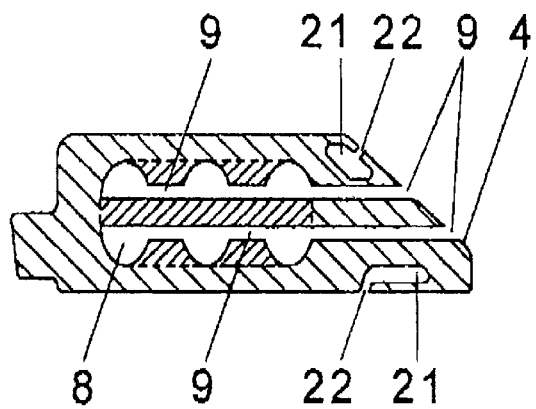
FIG. 5 shows a seal with an introduction part, with ducts as access to cavities in order to increase the contact pressure by internal pressure fed thereto, and with cavities or pockets for lubrication or for post-sealing purposes.

Referring to FIG. 5: the operation of fitting pipes one into the other, as described with reference to FIG. 2, involves the application of a considerable amount of force, not only because the seal has to be compressed but also because the relative displacement results in high levels of frictional force. Slip agents or lubricants are generally used to reduce those frictional forces, and this is conveniently possible with the present seal as shown in FIG. 5. The seal has cavities 21 for forming lubrication pockets which lead to the exterior by way of slots 22 or open locations. When pressure is applied to the introduction portion 4, the lubricant or slip agent issues and makes it easier to fit the components together. Post-sealing material in liquid or gel form can also be used as the slip agent. For example swellable polymers become active in conjunction with moisture or water and seal off creeping flows.

Figure 6:
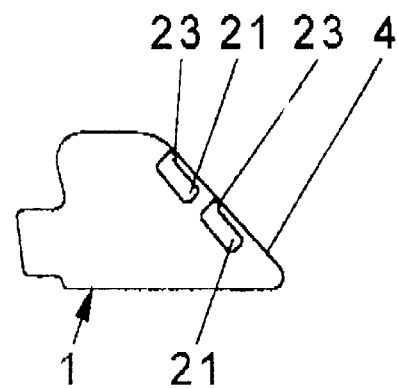
FIG. 6 shows an alternative configuration with cavities or pockets.

FIG. 6 shows a modification of the lubrication pockets 21, the slots 22 being covered by thin skins 23 which break open under the effect of pressure applied to the introduction region 4 so that the material disposed therein can issue with increasing pressure.

Figure 7:
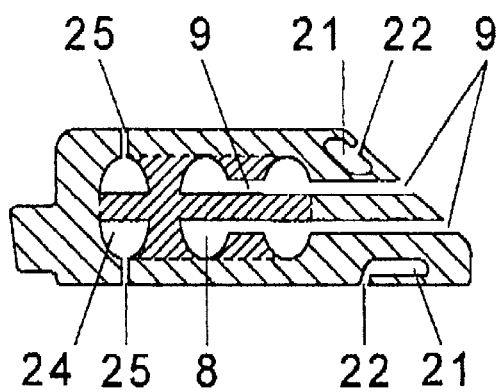
FIG. 7 shows a further embodiment of the seal with cavities for lubrication purposes and with cavities for post-sealing material.

FIG. 7 shows a similar cross-sectional view to that of FIG. 5, but a part 24 of the cavities 8 is filled with post-sealing material which can issue by way of perforations 25 or break-open locations. All latticework intermediate spaces can be filled with lubricant material and/or post-sealing material, in which case then the ducts 9 can be omitted because venting of the spaces 8 is no longer required.

Figure 8:
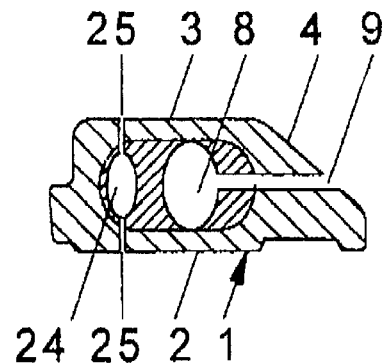
FIG. 8 shows the seal of FIG. 7 in a simplified form.

FIG. 8 shows a further simplified embodiment in comparison with FIG. 7, more specifically involving only one cavity 8 with a duct 9 and one cavity 24 for post-sealing material with discharge perforations 25.

Figure 9:
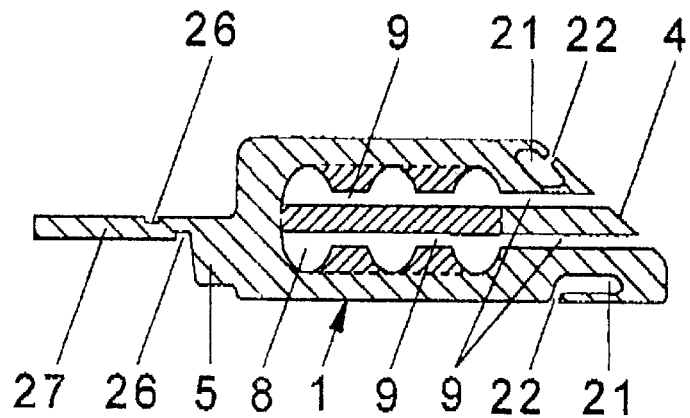
FIG. 9 shows a seal of FIG. 5 with a hinge part (support) for load distribution and shear load limitation for the installed condition.

FIG. 9 shows a similar cross-sectional view to that of FIG. 5, but a flap portion or lug 27 is connected to the projection or shoulder support 5 by way of two hinges or pivots 26 in order to extend into the shoulder gap 17 (FIG. 2). There, the flap portion or lug 27 becomes effective as a load-distributing means and also as a shear load limiting means.

Figure 10:
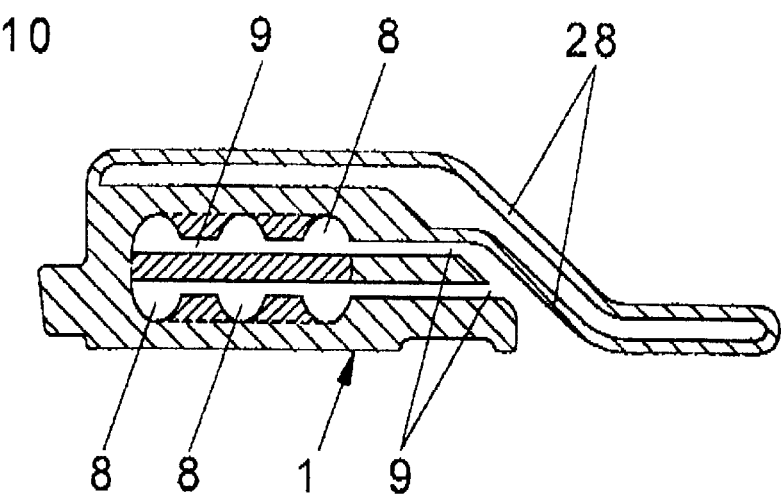
FIG. 10 shows a seal as shown in FIG. 5 with upwardly disposed slide casing.

FIG. 10 shows an embodiment in which a slide casing 28 performs the function of reducing friction and load distribution. When pipes are fitted together the slide casing 28 is pushed into the shoulder gap 17 and moved away from the introduction region so that after assembly the duct openings 9 are unconcealed and are not blocked.

Figure 11:
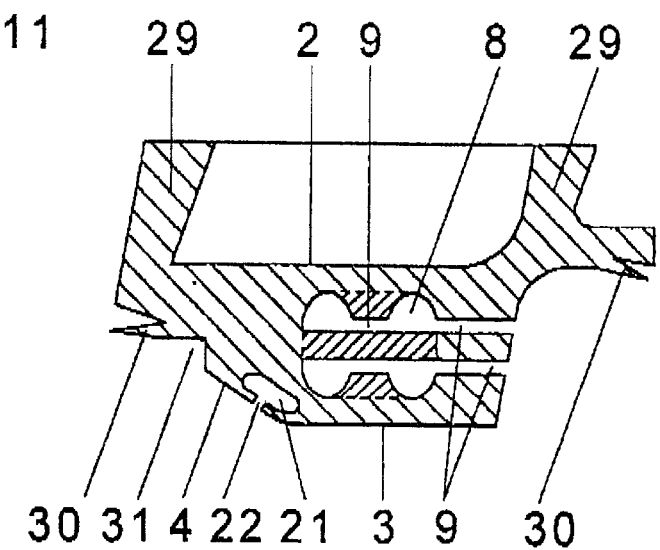
FIG. 11 shows a seal as shown in FIG. 5 but for installation in the socket of pipes.

FIG. 11 shows a seal for integral installation in a pipe socket when producing the seal from concrete mixture. Anchorage portions 29 are provided for that purpose. Sealing lips 30 are provided in order to keep the concrete mixture or cement mix away from the sealing surface 3. Disposed at the front in the insertion direction is a half-groove 31 for forming an abutment for the mold sleeve which serves as a mold in production of the pipe socket, in which the seal is integrated. Disposed between the radial pipe socket shoulder and the seal is an annular manoeuvring space for the spigot end, that space being occupied by a removable filling body. The seal is illustrated without that filling body.

Figure 12:
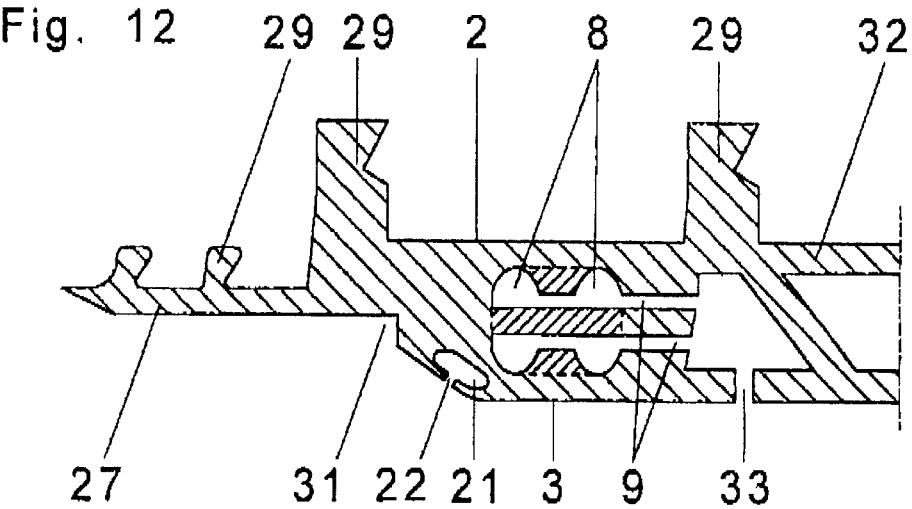
FIG. 12 shows an alternative embodiment for the seal shown in FIG. 11.

FIG. 12 shows a seal, also for integral installation in a pipe socket, but with a flexible filling body 32 and a load distribution element or shear load limiting means 27 which are connected to the actual seal. Access to the ducts 9 is afforded by way of openings 33. The seal is integrated into the pipe socket by way of the anchorage portions 29.

Figure 13:
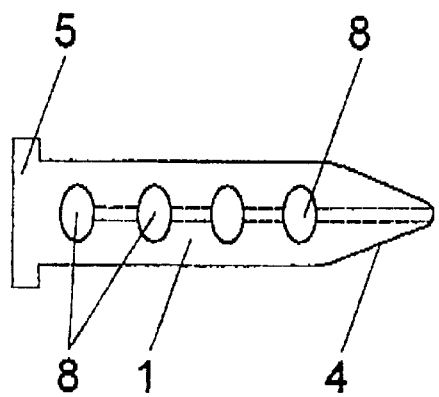
FIG. 13 shows a further embodiment of the seal for parallel gaps in a building structure.
Figure 14:
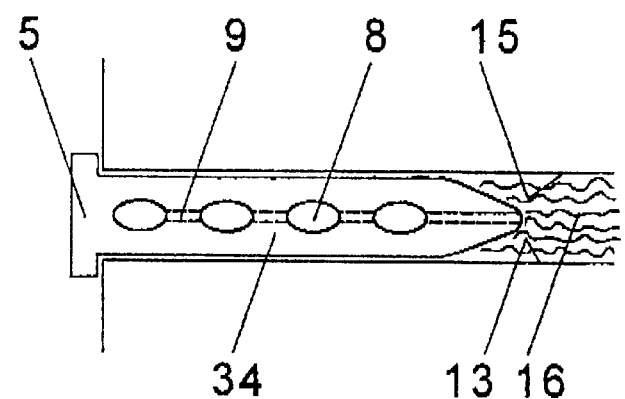
FIG. 14 shows the seal illustrated in FIG. 13 after installation.

FIGS. 13 and 14 show the use of the new seal in an embodiment in the form of a seal strip. The cross-sectional shape 34 of that seal is somewhat similar to a nail. A closed frame profile configuration is alternatively also possible. FIG. 13 shows the seal in the undeformed condition. The internal structure thereof corresponds to the principles described hereinbefore with reference to FIGS. 1 through 4. The introduction portion 4 is of a tapered configuration with two inclined surfaces so that the seal can be driven into an existing parallel building gap, as shown in FIG. 14.

Figure 15:
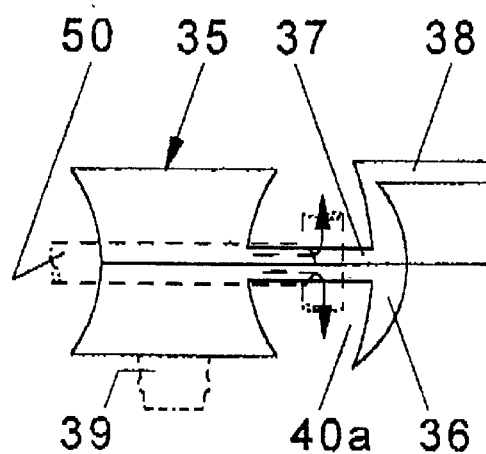
FIG. 15 shows a secondary seal for underground advanced pipes, designed for post-sealing.

FIG. 15 shows a view in cross-section through a secondary seal for use for example in underground pipe advance which operates in conjunction with a primary seal having one of the above described embodiments. In this case the secondary seal is disposed in a radial branch 40 of the socket gap. The seal includes a seal body 35 and a T-shaped extension 36, 37 comprising a web portion 36 and a transverse beam portion 37. Disposed at one end of the transverse beam portion 37 is a lug or flap portion 38 for fixing purposes. An extension 39 can also serve for fixing purposes. A filling device 50 with hose and check valve passes through the seal body 35 into spaces 40a of the radial socket gap 40 in order to introduce post-sealing material between the seal body 35 and the extension 36, 37.

Figure 16:
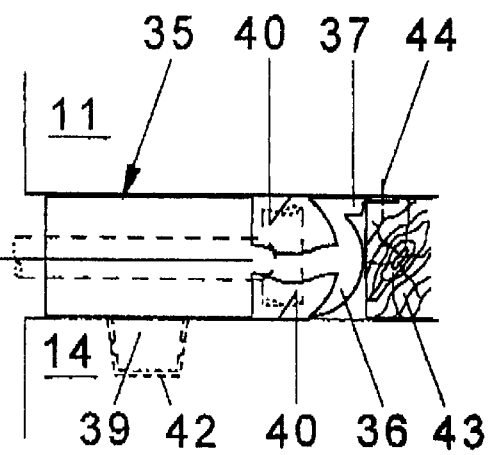
FIG. 16 shows the seal of FIG. 15 after installation.

FIG. 16 shows the secondary seal of FIG. 15 in the installed condition between a spigot end 11 and a socket 14, at the inward side of the radial gap formed between those two pipes. For the pipe advance operation, pieces of wood as load distribution elements 43 and the seal 35, 36, 37 are fitted into that radial gap 40, with the extension 39 engaging into a groove 42 in the pipe socket 14 in order to hold the seal. Alternatively fixing of the seal can be effected by means of flap or lug portions 37 on the piece of wood 43 by way of nails 44. When the pipes are advanced the secondary seal 35 is compressed because when the pipes are assembled the flanks move towards each other until the compensating and load distribution element 43 limits further compression.

FIGS. 17 and 18 show a view in cross-section through a further secondary seal for use for example in underground pipe advance. The seal comprises a seal body 35 which includes pockets or recesses 48 for post-sealing material and cover flaps 45 with perforations 47 and attachment projections 46. The pockets 48 are closed by means of the cover flaps 45 and the attachment projections 46 which engage into a groove 49 in the seal body 35. This affords a unitary seal body in which post-sealing material can issue from the pockets 48 when the seal is compressed. Fixing of the seal in the fitted position, for example to the ring 43 of wood which is already fixed to the pipe, can be effected by way of nails 44 or by glueing (FIG. 18). The post-sealing material can also be introduced after installation at a later time by way of the filling device 50.

FIG. 19 shows a filling device 50 as a composite system between the primary seal 1 and the secondary seal 35 which can be activated with an injection agent, wherein a better sealing effect is produced by way of an additional contact pressure produced in the filling device. The primary seal 1 has one or more cavities 51 which are connected by way of a pressure hose 52 to the filling device 50 and the seal 35 and the cavity or cavities 53 thereof. A setting agent is injected under pressure into the cavity or cavities 51 and is left to harden.

Figure 20:
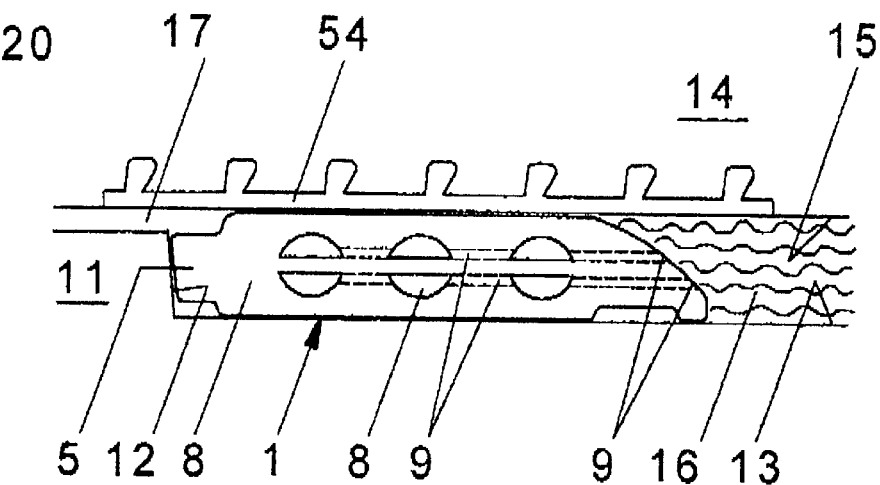
FIG. 20 shows a seal in the installed condition in which a counterpart sealing surface is clad with elastomer.

FIG. 20 shows a sealing system with welding. For that purpose, an additional shaped elastomer portion 54 is incorporated into the axial surface 15 of the pipe socket 14. With the passage of time, it is welded to the seal body, with a continuing pressure being applied.

Figure 21:
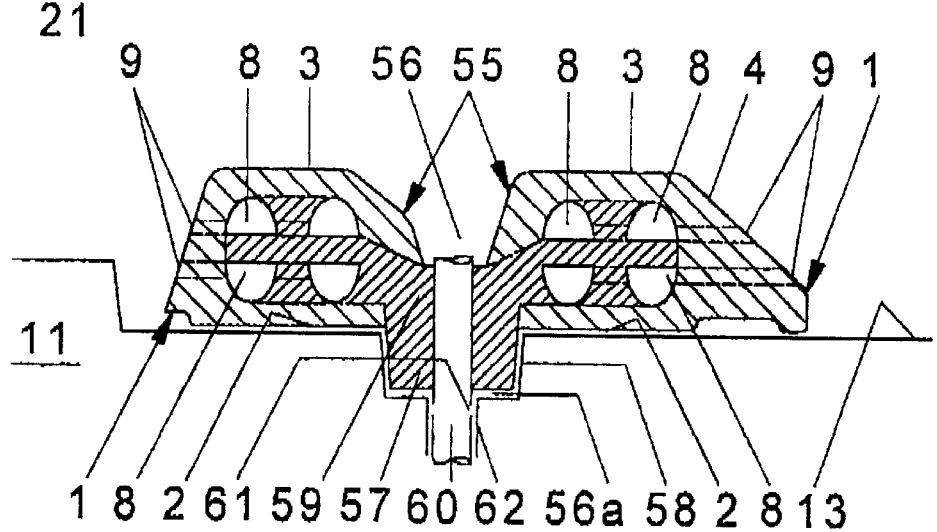
FIG. 21 shows a twin or duplex seal on a spigot end.

FIG. 21 shows a seal arrangement 55 with two coupled individual seals 1, between which extends a test space 56. Those two seals 1 are connected together by way of a web portion 59 which extends radially inwardly with a holding extension 57 in order to be held in a groove 58 in the annular surface 13 of the spigot end 11, while a test space 56a is still left free at the bottom of the annular groove. A test line 60 opens into both test spaces 56 and 56a. In the illustrated embodiment, the test line 60 has perforations 61 which ensure access to the test space 56a. The test line 60 is passed through a bore 62 into the pipe interior and from there to a test device (not shown).

When the pipe run is assembled the test space 56 is covered by the annular surface 15 of the pipe socket. Accordingly the test space 56 serves for checking sealing integrity at the annular surface 15 while the test space 56a serves for checking sealing integrity at the surface 13. A pressure medium is introduced under pressure into the test spaces 56 and 56a and the pressure drop is noted. If the pressure drop in relation to time is below a predetermined value the sealing effect is judged and documented as being satisfactory.

Air or a liquid, for example water, can be used as the pressure medium. When water is used as the test medium, the test space 56 should be vented, which can be effected for example by way of a double-pipe system instead of a single hose. A venting procedure of that kind is also effected if the test spaces 56 and 56a were to be used for post-sealing of the pipe socket connection, which is possible by way of the test line 60.

Figure 22:
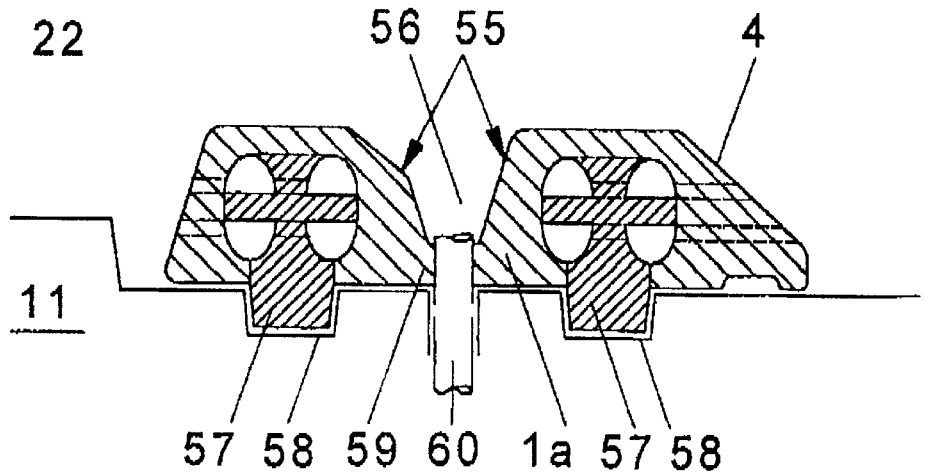
FIGS. 22 through 25 show modified twin or duplex seals with positional securing means as a spigot end seal.

A modified sealing arrangement 55 is shown in FIG. 22. Here the connecting web portion 59 comprises the soft elastomer material 1a. Each seal portion 1 has a holding extension 57 comprising the harder elastomer material 1b and engages into a corresponding groove 58 in the annular surface 13 at the spigot end 11. That prevents the seal arrangement 55 from being displaced when the socket is pushed over the seal upon assembly of the pipe run.

Figure 23:
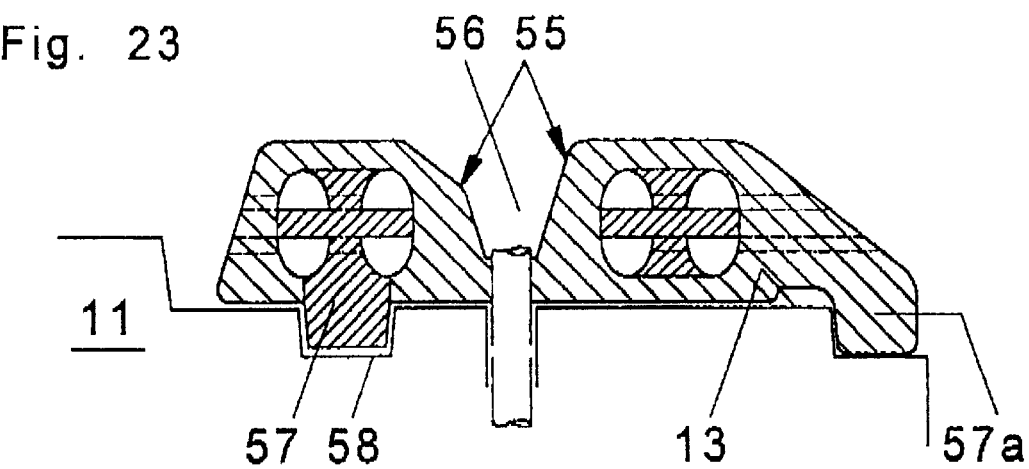
Figure 24:
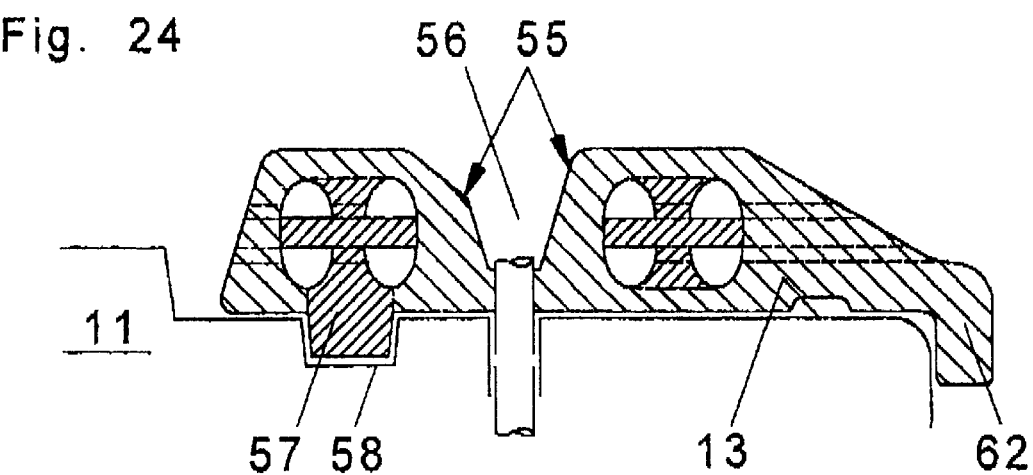

Further possible ways of holding the seal arrangement 55 to prevent displacement thereof are shown in FIGS. 23 and 24. In addition to the holding extension 57 for the one seal portion, there is a further holding extension 57a on the other seal portion; that further holding extension 57a either engages into a recess at the edge of the spigot end (FIG. 23) or it bears against the front radial surface of the spigot end (FIG. 24).

Figure 25:
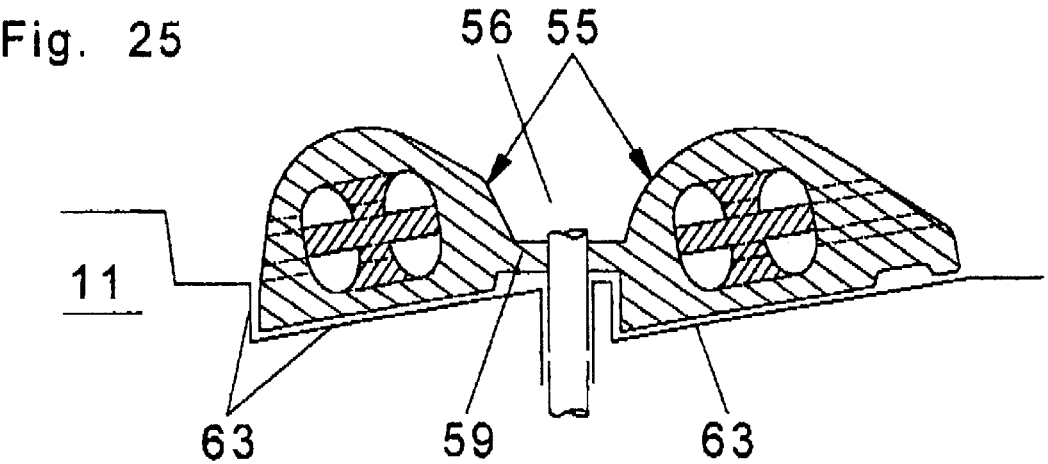

As FIG. 25 shows, the seal arrangement 55 can also be secured in position by way of inclined grooves 63 in the annular surface 13 of the spigot end.

Figure 26:
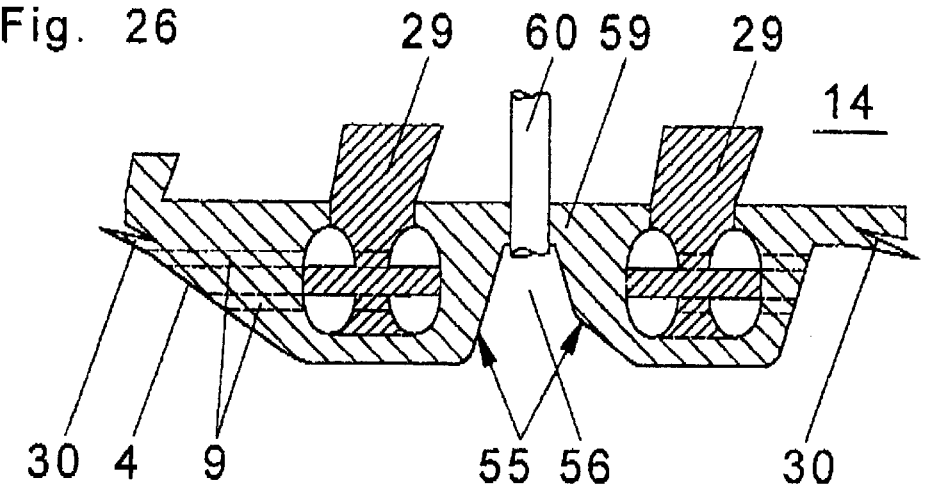
FIG. 26 shows a twin or duplex seal for installation in a socket.
Figure 27:
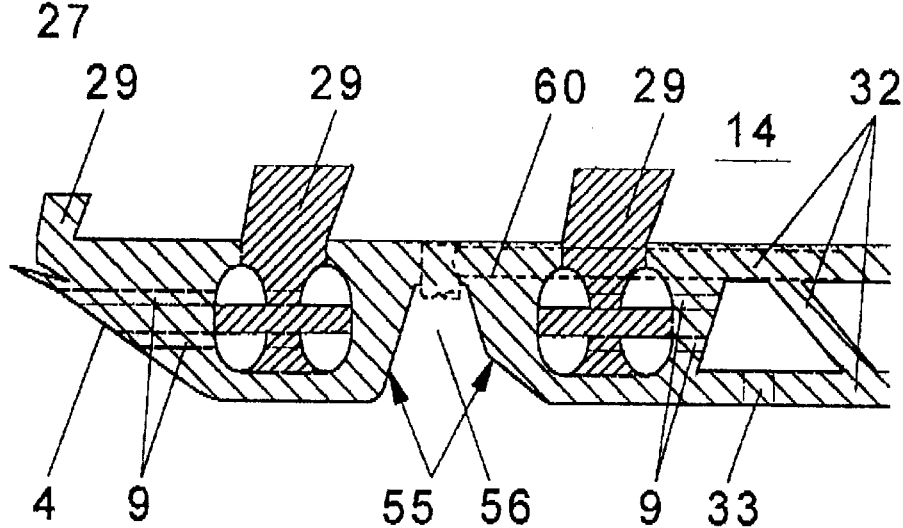
FIG. 27 shows a further socket twin or duplex seal.

The twin or duplex seal arrangement 55 can also be integrated into the pipe bell or socket, as FIGS. 26 and 27 show. In regard to installation, attention is directed to the description of FIGS. 11 and 12. The test line 60 can be passed radially outwardly (FIG. 26) or axially within the pipe run to the test apparatus.

Figure 28:
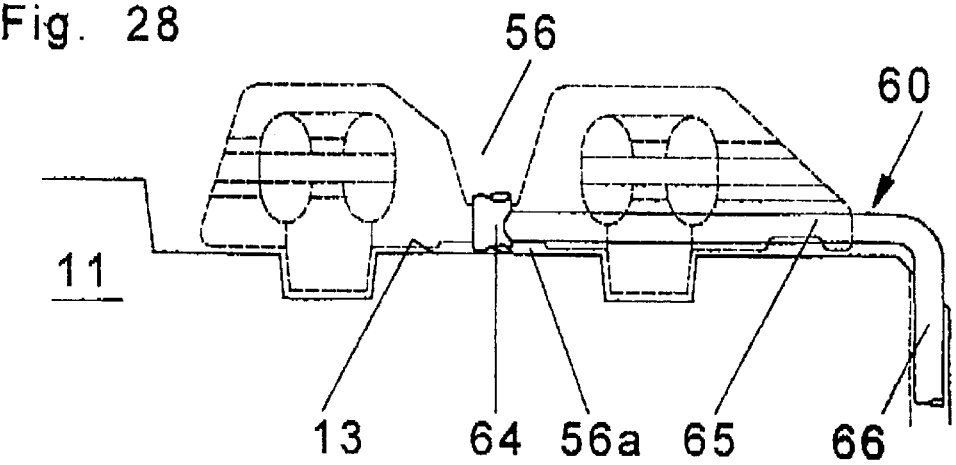
FIG. 28 shows checking access to the test spaces of a twin or duplex seal.
Figure 29:
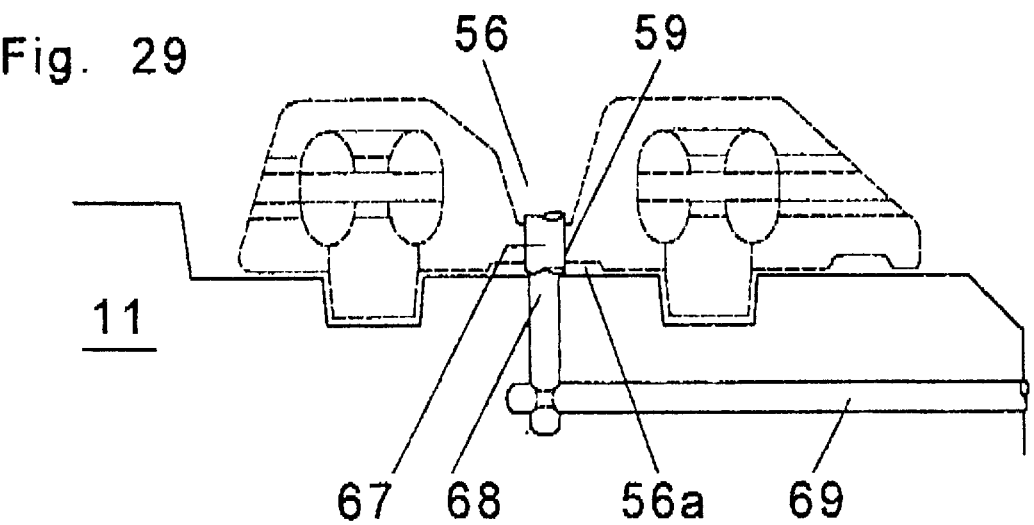
FIG. 29 shows further checking access to the test spaces of a twin or duplex seal.

FIGS. 28 and 29 show further possible ways of running the test line. The test line 60 can be passed over the annular surface 13 of the spigot end and a recess in the radial front face of the spigot end, with pipe portions 64, 65, 66 (FIG. 28) being used for that purpose. It is also possible to employ bores in the spigot end, more specifically a radial bore 68 and a bore 69 which is parallel to the axis (FIG. 29). The two test spaces 56 and 56a are communicated with each other by way of a bore in the connecting web portion of the seal portion. The bore can also be formed by a metal pipe connection portion 67 which is vulcanised into the connecting web portion 59.

Figure 30:
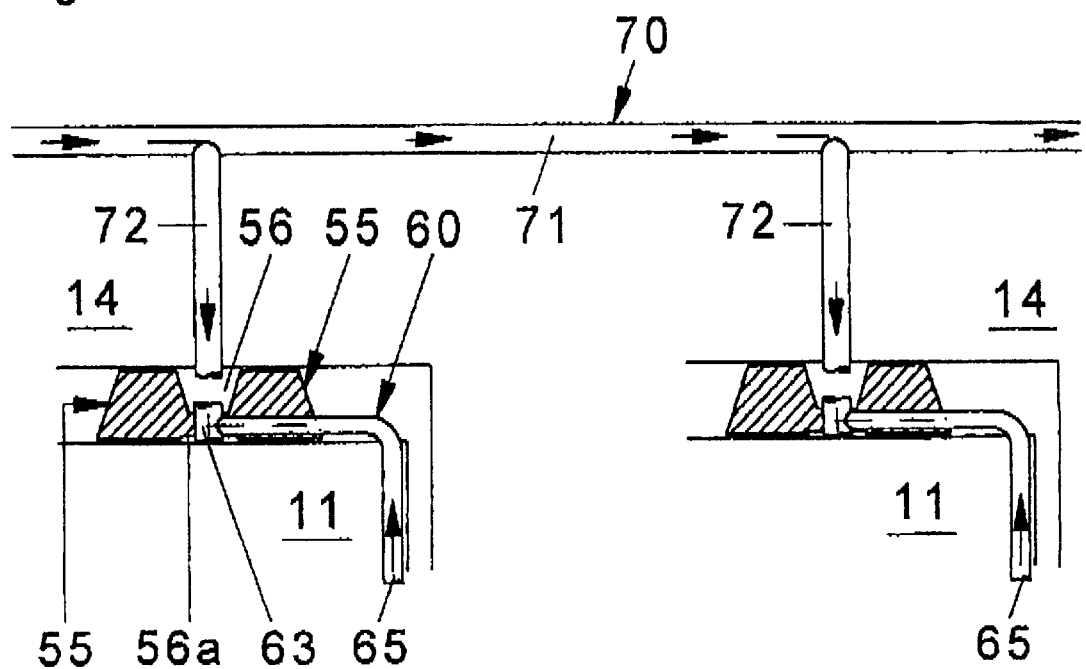
FIG. 30 is a diagrammatic view of a pipeline test section.

As mentioned the test line 60 can also be used for post-sealing of the seal locations. It is also possible to use two separate systems 60 and 70 for that purpose, as shown in FIG. 30. In one such case, each of the systems 60, 70 includes check valves so that medium is admitted into the test spaces 56 and 56a, but that medium is prevented from issuing through the respective other system. The system 70 includes a connecting line 71 which is laid from a central location, for example a test shaft, in the ground along the pipe run to be checked, and includes branch lines 72 with check valves, leading to the individual seal arrangements 56 to be checked. If leaks are detected, they can be post-sealed by way of the system 60.

Laid pipe runs can be tested in the following manner.

visual testing of the joins at the pipe sockets from one join to another by inspecting the pipes on foot by walking therealong, or by means of robots;

testing in respect of sealing integrity using air or water, which is effected from one pipe joint to another;

testing in respect of sealing integrity from one pipe joint to another with the possibility of one-off post-sealing;

testing in respect of sealing integrity from one pipe join to another with the possibility of effecting post-sealing using special post-sealing material which permits repeated post-sealing;

overall testing of the pipe run in respect of sealing integrity; and when leaks are detected effecting post-sealing at the leaking location.

What is claimed is:

1. A seal for insertion in a joint between components which define a higher pressure space and a lower pressure space comprising: a seal body (1) having a sealing section (16) and a leading in section (4) inserting said seal body into said joint, said sealing section comprising a latticework structure having first struts (6), second struts (7), and cavities between said first and second struts. Said first struts (6) being arranged to form pressure struts when said seal is inserted into said joint, and said second struts (7) being arranged to form drag struts when said first struts (6) yield under compressive loads; said seal body (1) being formed by co-extrusion of a relatively harder elastomeric substance, and a relatively softer elastomeric substance to form respectively, an edge region (1*a*), and a core region (1*b*).

2. A seal as set forth in claim 1, said seal forming a cavity (8), and a duct (9) communicating with said joint to enable use of said higher pressure space to increase contact pressure of said seal.

3. A seal as set forth in claim 2, further comprising a sealing portion (20) having mutually parallel sealing surfaces (2,3), said tensile struts (6), compressive struts (7), and said cavity (8) being positioned between said sealing surfaces.

* * * * *